United States Patent
Dakroub

(10) Patent No.: US 8,089,719 B1
(45) Date of Patent: Jan. 3, 2012

(54) FINDING TOUCHDOWN FREQUENCY FOR A HEAD IN A DISK DRIVE

(75) Inventor: Housan Dakroub, Savage, MN (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 12/791,546

(22) Filed: Jun. 1, 2010

(51) Int. Cl.
*G11B 21/02* (2006.01)

(52) U.S. Cl. ......................................... 360/75
(58) Field of Classification Search .................. None
See application file for complete search history.

(56) References Cited

U.S. PATENT DOCUMENTS

| | | | |
|---|---|---|---|
| 4,532,802 A | 8/1985 | Yeack-Scranton et al. | |
| 6,000,282 A | 12/1999 | Ku et al. | |
| 6,008,640 A | 12/1999 | Tan et al. | |
| 6,092,412 A | 7/2000 | Flechsig et al. | |
| 6,196,062 B1 | 3/2001 | Wright et al. | |
| 6,293,135 B1 | 9/2001 | Marchon et al. | |
| 6,600,622 B1 * | 7/2003 | Smith | 360/77.06 |
| 6,822,821 B2 | 11/2004 | Gan et al. | |
| 7,064,659 B2 | 6/2006 | Baumgartner et al. | |
| 7,121,133 B2 | 10/2006 | Chu et al. | |
| 7,190,547 B2 | 3/2007 | Khurshudov et al. | |
| 7,502,194 B2 | 3/2009 | Alexander et al. | |
| 7,630,162 B2 | 12/2009 | Zhao et al. | |
| 2008/0259480 A1 | 10/2008 | Pham et al. | |
| 2010/0177429 A1 * | 7/2010 | Lee et al. | 360/75 |

* cited by examiner

*Primary Examiner* — Andrew L Sniezek

(57) ABSTRACT

A disk drive comprising a head actuated over a disk, and a touchdown sensor for generating a sensor signal. The sensor signal is filtered using at least three bandpass filters to generate at least three filtered signals. The fly height of the head is decreased until one of the filtered signals indicates the head has contacted the disk.

39 Claims, 7 Drawing Sheets

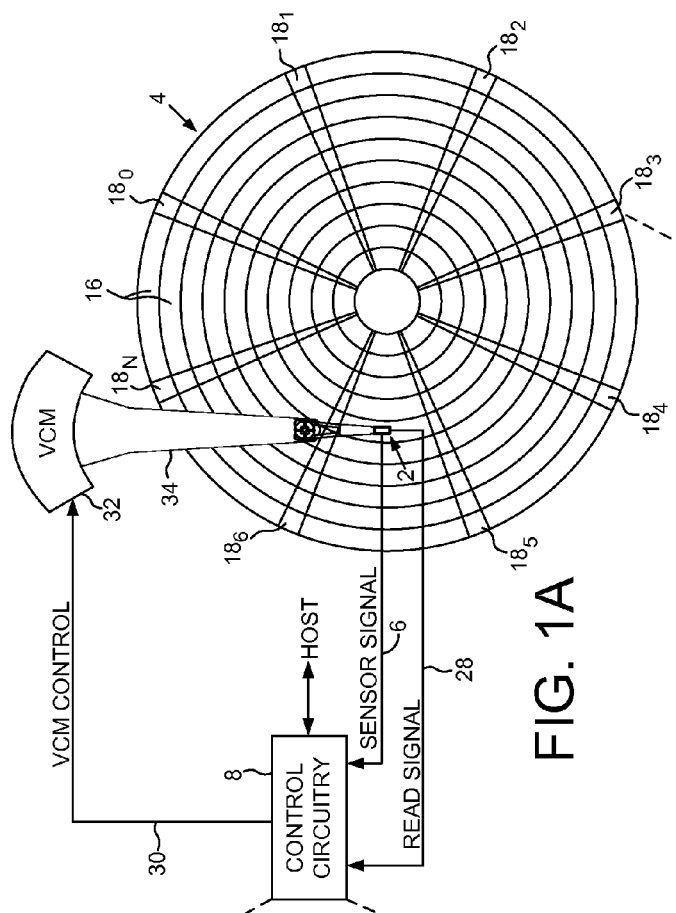
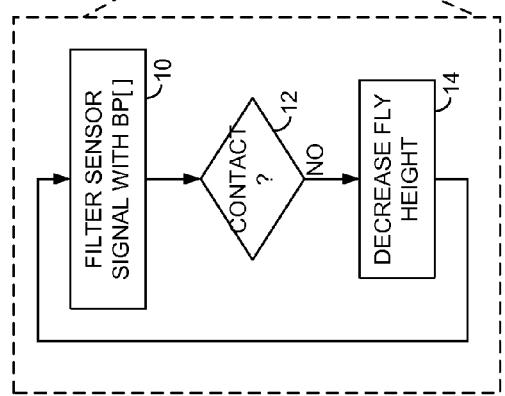
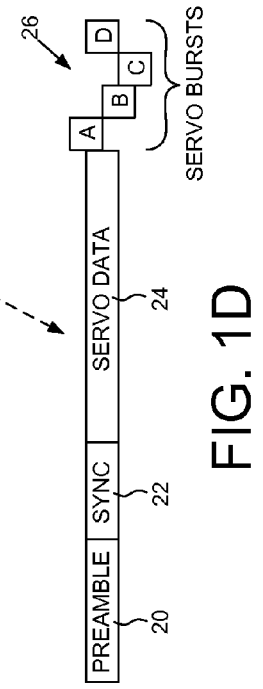
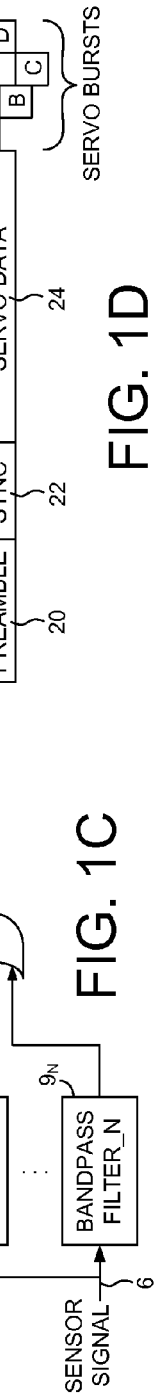

FINDING TOUCHDOWN FREQUENCY FOR A HEAD IN A DISK DRIVE

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

An air bearing forms between the head and the disk due to the disk rotating at high speeds. Since the quality of the write/read signal depends on the fly height of the head, conventional heads (e.g., magnetoresistive heads) may comprise an actuator for controlling the fly height. Any suitable fly height actuator may be employed, such as a heater which controls fly height through thermal expansion, or a piezoelectric (PZT) actuator. It is desirable to determine the appropriate fly height actuator control signal (e.g., appropriate current applied to a heater) that achieves the target fly height for the head.

BRIEF DESCRIPTION OF THE DRAWINGS

FIG. 1A shows a disk drive according to an embodiment of the present invention comprising a head actuated over a disk, and a touchdown sensor integrated with the head for generating a sensor signal indicating when the head contacts the disk.

FIG. 1B is a flow diagram executed by the control circuitry wherein the sensor signal is filtered with at least three bandpass filters to detect the head/disk contact according to an embodiment of the present invention.

FIG. 1C shows a plurality of bandpass filters for filtering the sensor signal according to an embodiment of the present invention.

FIG. 1D shows a format of a servo sector according to an embodiment of the present invention.

DETAILED DESCRIPTION OF EMBODIMENTS OF THE INVENTION

Figure 1E:
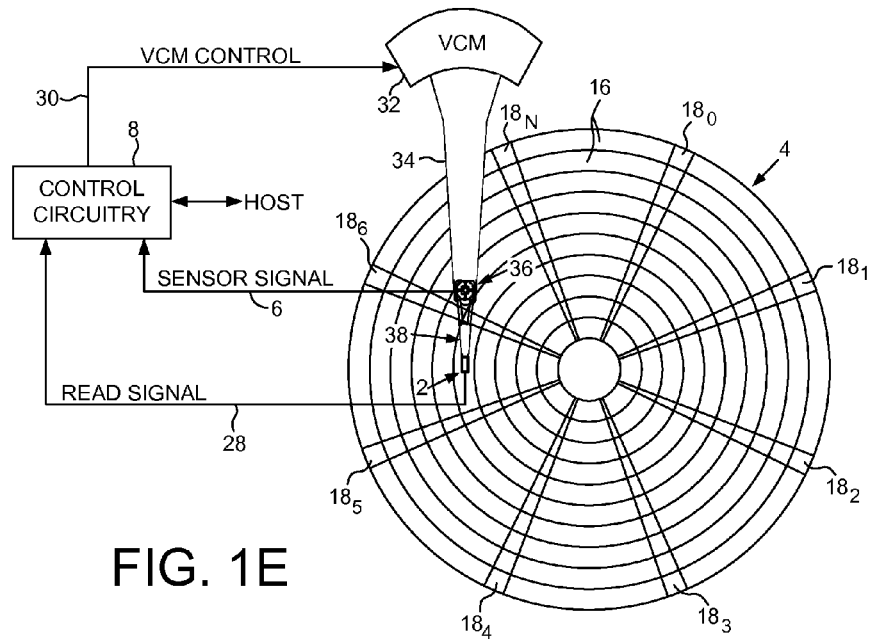
FIG. 1E shows a disk drive according to an embodiment of the present invention wherein the touchdown sensor comprises a microactuator coupling a suspension to an actuator arm.

FIG. 1A shows a disk drive according to an embodiment of the present invention comprising a head 2 actuated over a disk 4, and a touchdown sensor for generating a sensor signal 6. The disk drive further comprises control circuitry 8 for executing the flow diagram of FIG. 1B, wherein the sensor signal is filtered using at least three bandpass filters $9_1$-$9_N$ (FIG. 1C) to generate at least three filtered signals (step 10). The fly height of the head 2 is decreased (step 14) until one of the filtered signals indicates the head has contacted the disk (step 12).

In the embodiment of FIG. 1A, the disk 4 comprises a plurality of tracks 16 defined by embedded servo sectors $18_0$-$18_N$. FIG. 1D shows an example format of a servo sector comprising a preamble 20 for storing a periodic pattern, which allows proper gain adjustment and timing synchronization of the read signal, and a sync mark 22 for storing a special pattern used to symbol synchronize to a servo data field 24. The servo data field 24 stores coarse head positioning information, such as a servo track address, used to position the head over a target data track during a seek operation. Each servo sector further comprises groups of servo bursts 26 (e.g., A, B, C and D bursts), which comprise a number of consecutive transitions recorded at precise intervals and offsets with respect to a data track centerline. The groups of servo bursts 26 provide fine head position information used for centerline tracking while accessing a data track during write/read operations. As the head 2 passes over a servo sector, the control circuitry 8 demodulates the read signal 28 into a position error signal (PES). The PES is filtered by a suitable compensation filter to generate a control signal 30 applied to a voice coil motor (VCM) 32. The VCM 32 rotates an actuator arm 34 about a pivot in order to position the head 2 radially over the disk 4 in a direction that reduces the PES.

In the embodiments of the present invention, the disk drive comprises a suitable fly height actuator (e.g., a heating element or piezoelectric (PZT) actuator) for controlling the fly height of the head 2. In the embodiment of FIG. 1A, the fly height actuator is integrated with the head assembly, such as by coupling a slider to a gimbal (not shown). In one embodiment, the touchdown sensor comprises the fly height actuator; that is, the fly height actuator may generate the sensor signal used to detect touchdown. In another embodiment, the touchdown sensor may comprise a microactuator for actuating the head over the disk (e.g., by actuating a gimbal or slider), wherein the microactuator also generates the sensor signal for detecting touchdown. In yet another embodiment, the touchdown sensor may comprise dedicated circuitry integrated with the head, such as a dedicated PZT or a capacitor sensor for sensing the fly height of the head relative to a capacitance between the head and the disk surface.

Figure 1F:
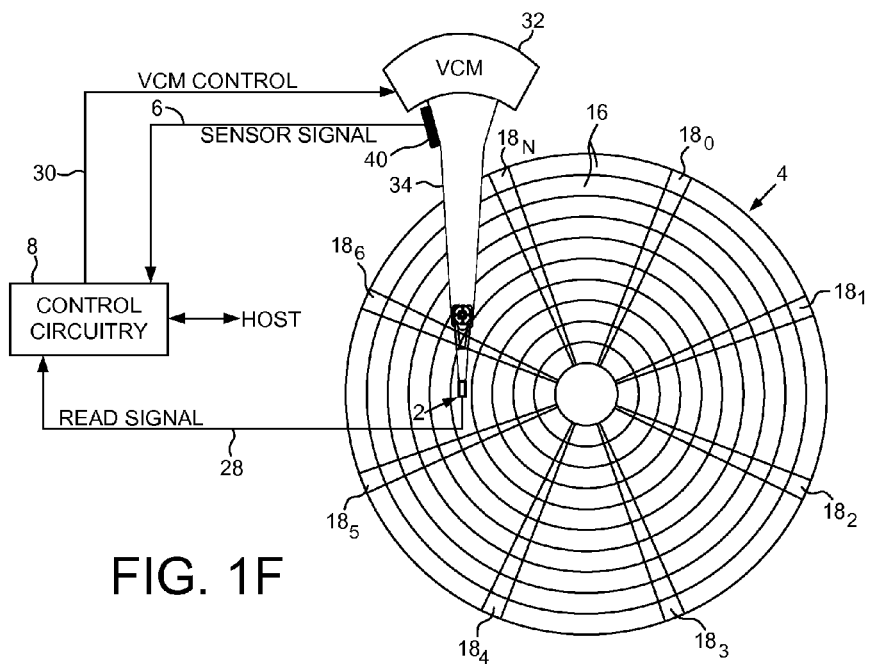
FIG. 1F shows a disk drive according to an embodiment of the present invention wherein the touchdown sensor is mounted to an actuator arm.

The touchdown sensor may be located at any suitable location within the disk drive. FIG. 1E shows a disk drive according to an embodiment of the present invention wherein the touchdown sensor comprises a microactuator 36 for actuating the head over the disk, wherein the microactuator 36 couples a suspension 38 to an actuator arm 34. FIG. 1F shows a disk drive according to an embodiment of the present invention wherein the touchdown sensor comprises a sensor 40 (e.g., a PZT sensor) coupled to the actuator arm 34. The sensor 40 may be dedicated to touchdown detection, or the sensor 40 may be used for other reasons in addition to touchdown detection, such as shock detection or drop detection (acceleration detection).

Figure 2A:
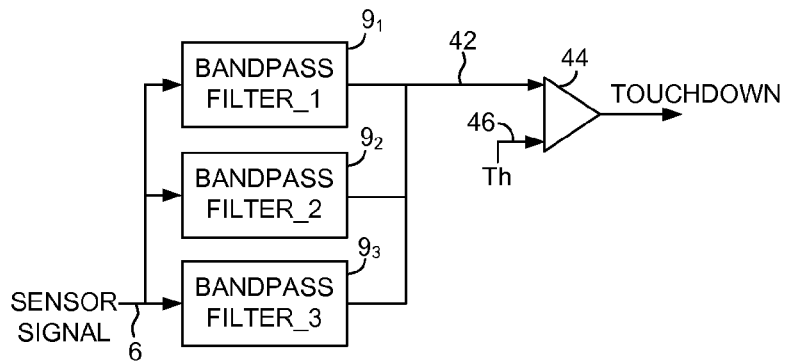
FIG. 2A shows an embodiment of the present invention wherein the output of the bandpass filters are wire-ORed and then compared to a threshold.
Figure 2B:
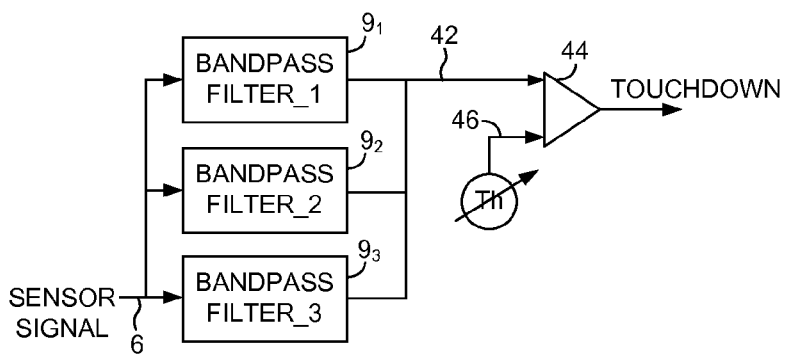
FIG. 2B shows an embodiment of the present invention wherein the threshold for detecting touchdown is adjustable.
Figure 2C:
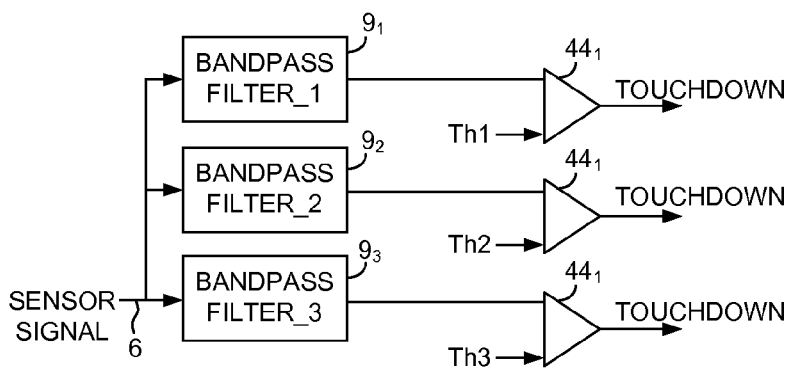
FIG. 2C shows an embodiment of the present invention wherein the output of each bandpass filter is compared to a respective threshold.

The filtered signals generated by the bandpass filters $9_1$-$9_N$ may be processed in any suitable manner in the embodiments of the present invention. FIG. 2A shows an embodiment wherein the filtered signals are wire-ORed to generate a composite signal 42, and the composite signal 42 compared 44 to a threshold 46. In this embodiment, the touchdown will be detected when any one of the filtered signals exceeds the threshold. In an embodiment shown in FIG. 2B, the control circuitry 8 adjusts the threshold 46 in order to tune the sensitivity of the touchdown detection. In an embodiment shown in FIG. 2C, each filtered signal generated by the bandpass filters $9_1$-$9_N$ is compared $44_1$-$44_N$ to a respective threshold. In this embodiment, the touchdown is detected when one of the filtered signals exceeds its respective threshold, and in one embodiment the control circuitry 8 may adjust each threshold in order to tune the sensitivity of each bandpass filter.

Figure 2D:
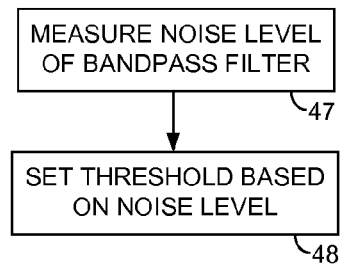
FIG. 2D is a flow diagram according to an embodiment of the present invention wherein the threshold for detecting touchdown is adjusted relative to a noise level of the bandpass filter.

The control circuitry 8 may tune the sensitivity of the touchdown detection in any suitable manner. FIG. 2D is a flow diagram according to an embodiment of the present invention wherein a noise level of each bandpass filter may be measured (step 47) and the threshold adjusted accordingly (step 48). The noise level may be measured in any suitable manner, such as by measuring the output of each bandpass filter with a nominal or calibrated control signal applied to the fly height actuator (e.g., while servoing the head over a track). The threshold for detecting touchdown may also be selected in any suitable manner, such as by adding an offset to the noise level of each bandpass filter.

Figure 2E:
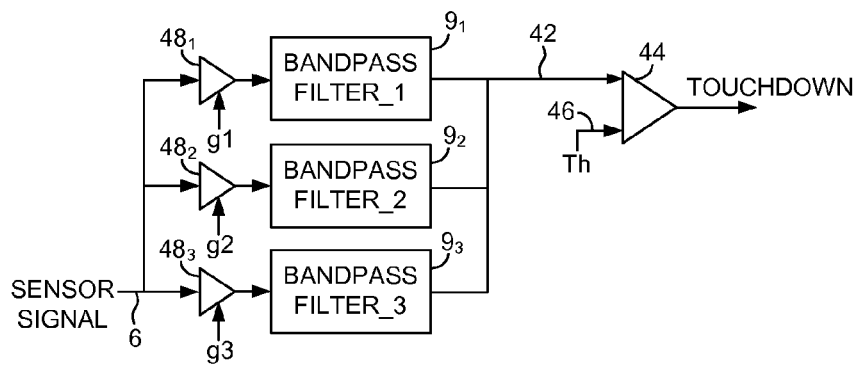
FIG. 2E shows an embodiment of the present invention wherein a gain of each bandpass filter is adjusted.

FIG. 2E shows an alternative embodiment for adjusting the sensitivity of the touchdown detection by adjusting a gain value $48_1$-$48_N$ of each bandpass filter $9_1$-$9_N$ using any suitable algorithm. For example, the gain values may be adjusted relative to a noise level of each bandpass filter as described above.

Figure 2F:
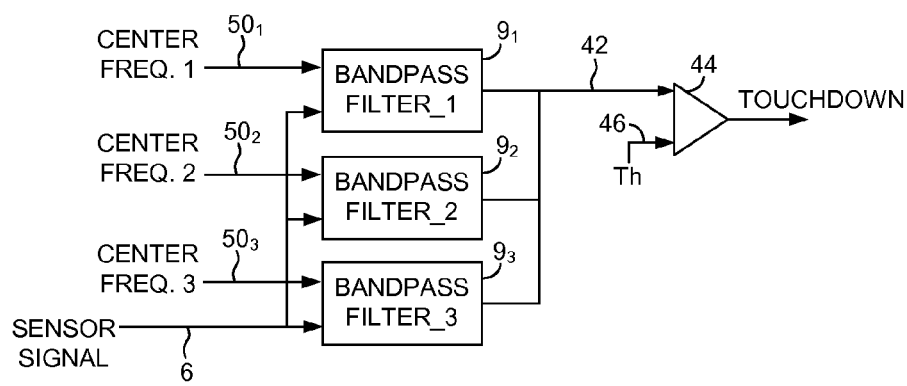
FIG. 2F shows an embodiment of the present invention wherein a center frequency of each bandpass filter is adjusted.
Figure 3A:
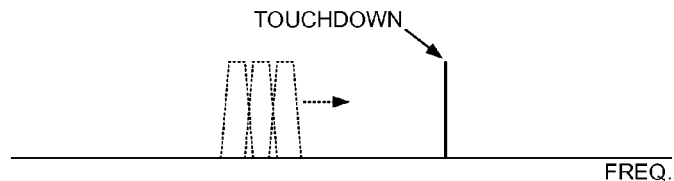
FIGS. 3A-3D show an embodiment of the present invention wherein the center frequencies of the bandpass filters are shifted until touchdown is detected.
Figure 3B:
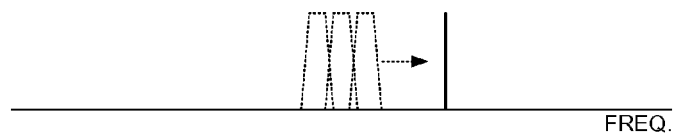
Figure 3C:
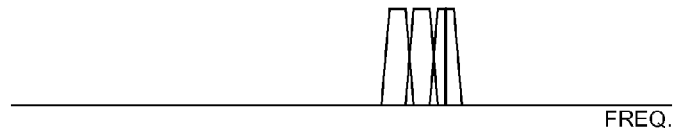
Figure 3D:
Figure 4:
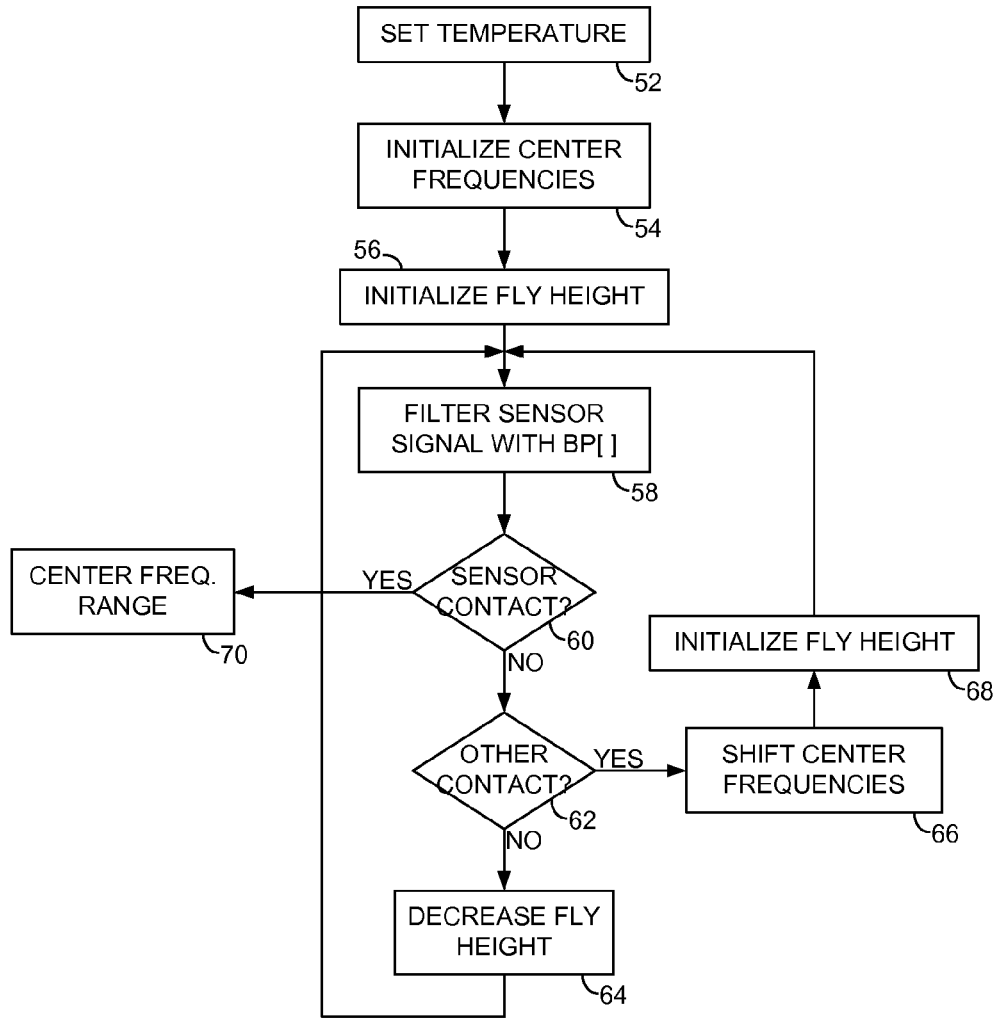
FIG. 4 is a flow diagram according to an embodiment of the present invention wherein an ambient temperature of the disk drive is set to a nominal value and then the center frequencies of the bandpass filters shifted until touchdown is detected.

FIG. 2F shows an embodiment of the present invention wherein the control circuitry 8 adjusts a center frequency $50_1$-$50_N$ of each bandpass filter $9_1$-$9_N$. In one embodiment, the control circuitry 8 adjusts the center frequency of the bandpass filters $9_1$-$9_N$ in order to shift the frequency responses until the touchdown frequency is detected. This embodiment is illustrated in the flow diagram of FIG. 4 which is further understood with reference to FIGS. 3A-3D. In one embodiment, the flow diagram of FIG. 4 is executed during a manufacturing process wherein the ambient temperature of the disk drive can be set to a nominal value (step 52). The center frequencies of the bandpass filters are initialized (step 54) and a fly height of the head is initialized (step 56), wherein in one embodiment the initial settings are proximate the final settings based on a priori information (e.g., pre-characterizations, previous calibrations, current environmental parameters, etc.). The sensor signal generated by the touchdown sensor is filtered by the bandpass filters (step 58), and the filtered sensor signals evaluated to determine whether touchdown has been detected (step 60). If touchdown has not been detected (step 60), another, less sensitive technique for detecting touchdown is evaluated (e.g., detecting a change in rotation speed, change in the amplitude of a read signal, etc.). If touchdown is not detected using the less sensitive technique (step 62), the fly height of the head is decreased (step 64) and the process repeated starting from step 58. If touchdown is detected using the less sensitive technique (step 62), the center frequencies of the bandpass filters are shifted (step 66) so as to shift the frequency bands as illustrated in FIGS. 3A-3B. The fly height of the head is re-initialized (step 68), and the process repeated starting from step 58 until the touchdown frequency is detected (step 60) as illustrated in FIG. 3C.

In one embodiment after detecting the touchdown frequency, the center frequencies of at least one of the bandpass filter is adjusted in order to center the frequency range spanned by the bandpass filters about the touchdown frequency (step 70). An example of this embodiment is illustrated in FIG. 3D wherein after detecting the touchdown frequency the center frequencies of the bandpass filters are adjusted so that the touchdown frequency is detected by the middle band of the frequency range. In this manner, if the touchdown frequency changes over time when recalibrating the fly height of the head (e.g., periodically or in response to a change in the ambient temperature), the shift in the touchdown frequency may still be covered by the frequency range of the bandpass filters.

Figure 5:
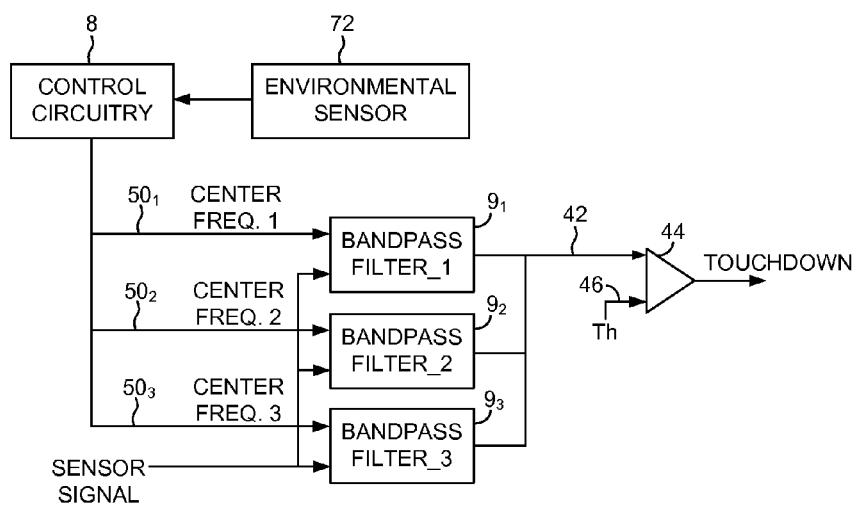
FIG. 5 shows an embodiment of the present invention wherein the center frequencies of the bandpass filters are adjusted in response to an environmental sensor.

In one embodiment, a significant change in an environmental condition (e.g., temperature, pressure, humidity, etc.) may cause the touchdown frequency to shift outside the frequency range of the bandpass filters. In an embodiment shown in FIG. 5, the control circuitry 8 is responsive to an environmental sensor 72 for adjusting at least one center frequency of the bandpass filters $9_1$-$9_N$ in response to a change in an environmental condition. In one embodiment, a correlation between the change in environmental condition and the change in the touchdown frequency is calibrated for a family of disk drives, and then the correlation is used to adjust the center frequencies of each production disk drive in response to the environmental sensor 72 while deployed in the field.

Figure 6:
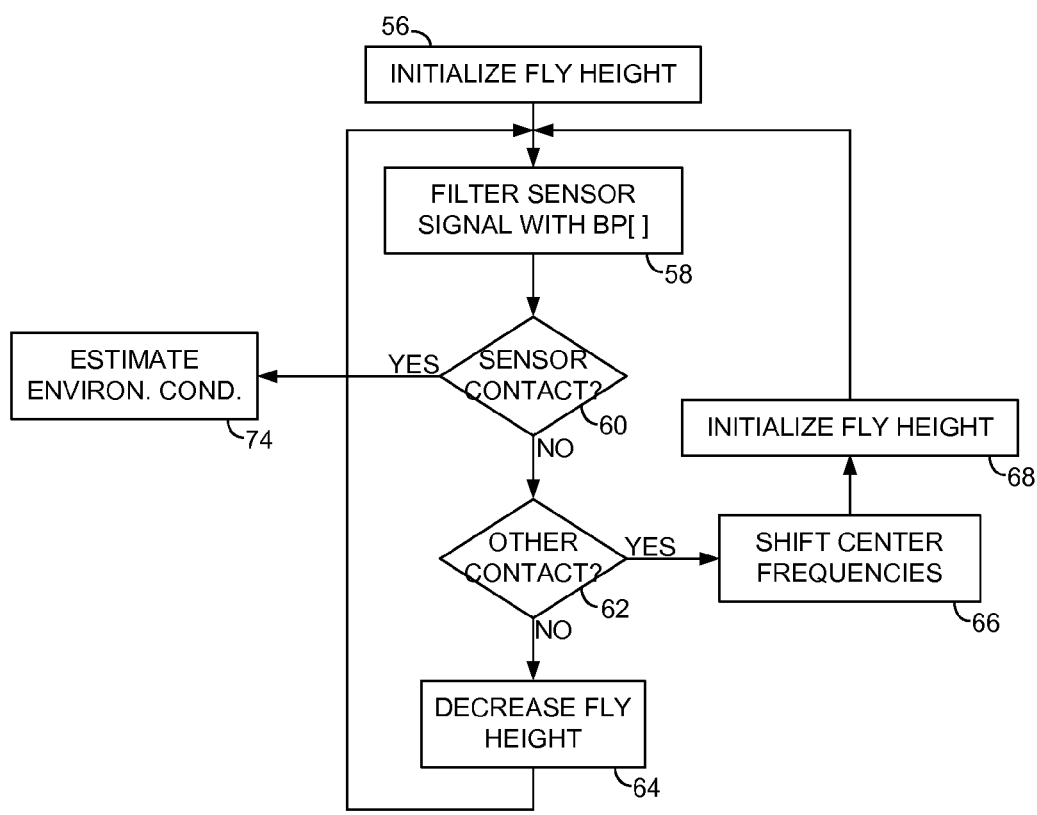
FIG. 6 is a flow diagram according to an embodiment of the present invention wherein an environmental condition is estimated based on the center frequency of the bandpass filter that detects touchdown.

In another embodiment of the present invention, the shift in the touchdown frequency as detected by the bandpass filters is used to detect a change in an environmental condition (e.g., temperature, pressure, humidity, etc.). This embodiment is understood with reference to the flow diagram of FIG. 6 wherein when touchdown is detected (step 60), the bandpass filter that detected the touchdown is an indication of the environmental condition. For example, if the ambient temperature changes, the touchdown frequency shown in FIG. 3D may shift left or right such that the left or right frequency band detects the touchdown. Accordingly, the detected touchdown frequency may be converted to an estimated change in an environmental condition; that is, the bandpass filters $9_1$-$9_N$ may be used in place of (or in addition to) different types of environmental sensors. When the bandpass filters $9_1$-$9_N$ detect a change in the environmental condition, other components of the disk drive may be adjusted such as decreasing the seek speed of the VCM 32 to prevent overheating.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk;
   a head actuated over the disk
   a touchdown sensor for generating a sensor signal; and
   control circuitry operable to:
     filter the sensor signal using at least three bandpass filters to generate at least three filtered signals; and
     decrease the fly height of the head until one of the filtered signals indicates the head has contacted the disk,
   wherein:
     the bandpass filters collectively span a frequency range; and
     the control circuitry is operable to adjust a center frequency of at least one of the bandpass filters in order to substantially center the frequency range about a frequency defined by the filtered signal that indicates the head has contacted the disk.

2. The disk drive as recited in claim 1, wherein the touchdown sensor is integrated with the head.

3. The disk drive as recited in claim 1, wherein the touchdown sensor comprises a microactuator for actuating the head over the disk.

4. The disk drive as recited in claim 1, wherein:
   the head is coupled to a distal end of an actuator arm; and
   the touchdown sensor is mounted on the actuator arm.

5. The disk drive as recited in claim 1, wherein:
   the filtered signals are wired-ORed to generate a composite signal; and
   the control circuitry is operable to detect when the head contacts the disk by comparing the composite signal to a threshold.

6. The disk drive as recited in claim 5, wherein the control circuitry is operable to adjust the threshold.

7. The disk drive as recited in claim 1, wherein the control circuitry is operable to detect when the head contacts the disk by comparing each filtered signal to a respective threshold.

8. The disk drive as recited in claim 7, wherein at least two of the respective thresholds are different.

9. The disk drive as recited in claim 8, wherein the control circuitry is operable to adjust at least one of the respective thresholds.

10. The disk drive as recited in claim 1, wherein the control circuitry is operable to:
    measure a noise level of at least one of the bandpass filters; and
    adjust a threshold for detecting the head has contacted the disk in response to the noise level.

11. The disk drive as recited in claim 1, wherein the control circuitry is operable to adjust a gain of at least one of the bandpass filters.

12. The disk drive as recited in claim 1, wherein the control circuitry is operable to adjust a center frequency of at least one of the bandpass filters.

13. The disk drive as recited in claim 12, wherein the control circuitry is operable to adjust the center frequency of at least one of the bandpass filters until one of the filtered signals indicates the head has contacted the disk.

14. The disk drive as recited in claim 13, wherein the control circuitry is operable to estimate an environmental condition in response to the sensor signal that indicates the head has contacted the disk.

15. The disk drive as recited in claim 12, wherein the control circuitry is operable to adjust the center frequency of at least one of the bandpass filters in response to the filtered signal that indicates the head has contacted the disk.

16. The disk drive as recited in claim 12, wherein:
    the disk drive comprises an environmental sensor; and
    the control circuitry is operable to adjust the center frequency of at least one of the bandpass filters in response to the environmental sensor.

17. A method of calibrating a touchdown in a disk drive, the disk drive comprising a head actuated over a disk, and a touchdown sensor for generating a sensor signal, the method comprising:
    filtering the sensor signal using at least three bandpass filters to generate at least three filtered signals; and
    decreasing the fly height of the head until one of the filtered signals indicates the head has contacted the disk,
    wherein:
    the bandpass filters collectively span a frequency range; and
    further comprising adjusting a center frequency of at least one of the bandpass filters in order to substantially center the frequency range about a frequency defined by the filtered signal that indicates the head has contacted the disk.

18. The method as recited in claim 17, wherein the touchdown sensor is integrated with the head.

19. The method as recited in claim 17, wherein the touchdown sensor comprises a microactuator for actuating the head over the disk.

20. The method as recited in claim 17, wherein:
    the head is coupled to a distal end of an actuator arm; and
    the touchdown sensor is mounted on the actuator arm.

21. The method as recited in claim 17, wherein:
    the filtered signals are wired-ORed to generate a composite signal; and
    the method further comprises detecting when the head contacts the disk by comparing the composite signal to a threshold.

22. The method as recited in claim 21, further comprising adjusting the threshold.

23. The method as recited in claim 17, further comprising detecting when the head contacts the disk by comparing each filtered signal to a respective threshold.

24. The method as recited in claim 23, wherein at least two of the respective thresholds are different.

25. The method as recited in claim 24, further comprising adjusting at least one of the respective thresholds.

26. The method as recited in claim 17, further comprising:
    measuring a noise level of at least one of the bandpass filters; and
    adjusting a threshold for detecting the head has contacted the disk in response to the noise level.

27. The method as recited in claim 17, further comprising adjusting a gain of at least one of the bandpass filters.

28. The method as recited in claim 17, further comprising adjusting a center frequency of at least one of the bandpass filters.

29. The method as recited in claim 28, further comprising adjusting the center frequency of at least one of the bandpass filters until one of the filtered signals indicates the head has contacted the disk.

30. The method as recited in claim 29, further comprising estimating an environmental condition in response to the sensor signal that indicates the head has contacted the disk.

31. The method as recited in claim 28, further comprising adjusting the center frequency of at least one of the bandpass filters in response to the filtered signal that indicates the head has contacted the disk.

32. The method as recited in claim 28, further comprising adjusting the center frequency of at least one of the bandpass filters in response to an environmental sensor.

33. The method as recited in claim 17, further comprising setting an ambient temperature of the disk drive to a nominal value.

34. A disk drive comprising:
a disk;
a head actuated over the disk
a touchdown sensor for generating a sensor signal; and
control circuitry operable to:
   filter the sensor signal using at least three bandpass filters to generate at least three filtered signals; and
   decrease the fly height of the head until one of the filtered signals indicates the head has contacted the disk,
   wherein:
   the disk drive comprises an environmental sensor; and
   the control circuitry is operable to adjust a center frequency of at least one of the bandpass filters in response to the environmental sensor.

35. A method of calibrating a touchdown in a disk drive, the disk drive comprising a head actuated over a disk, and a touchdown sensor for generating a sensor signal, the method comprising:
filtering the sensor signal using at least three bandpass filters to generate at least three filtered signals;
decreasing the fly height of the head until one of the filtered signals indicates the head has contacted the disk; and
adjusting a center frequency of at least one of the bandpass filters in response to an environmental sensor.

36. A disk drive comprising:
a disk;
a head actuated over the disk
a touchdown sensor for generating a sensor signal; and
control circuitry operable to:
   filter the sensor signal using at least three bandpass filters to generate at least three filtered signals;
   decrease the fly height of the head until one of the filtered signals indicates the head has contacted the disk; and
   estimate an environmental condition in response to the sensor signal that indicates the head has contacted the disk.

37. The disk drive as recited in claim 36, wherein the environmental condition comprises an ambient temperature.

38. A method of calibrating a touchdown in a disk drive, the disk drive comprising a head actuated over a disk, and a touchdown sensor for generating a sensor signal, the method comprising:
filtering the sensor signal using at least three bandpass filters to generate at least three filtered signals;
decreasing the fly height of the head until one of the filtered signals indicates the head has contacted the disk; and
estimating an environmental condition in response to the sensor signal that indicates the head has contacted the disk.

39. The method as recited in claim 38, wherein the environmental condition comprises an ambient temperature.

* * * * *